United States Patent
Hashimoto et al.

(10) Patent No.: US 9,076,999 B2
(45) Date of Patent: Jul. 7, 2015

(54) LAMINATING WATER-BASED SURFACE TREATMENT AGENT, SURFACE TREATMENT METHOD AND SURFACE TREATED MATERIAL

(71) Applicants: Daisuke Hashimoto, Oyama (JP); Takurou Watanabe, Oyama (JP)

(72) Inventors: Daisuke Hashimoto, Oyama (JP); Takurou Watanabe, Oyama (JP)

(73) Assignee: Showa Denko Packaging Co., Ltd., Kanagawa (JP)

( * ) Notice: Subject to any disclaimer, the term of this patent is extended or adjusted under 35 U.S.C. 154(b) by 106 days.

(21) Appl. No.: 13/868,201

(22) Filed: Apr. 23, 2013

(65) Prior Publication Data
US 2013/0280593 A1  Oct. 24, 2013

(30) Foreign Application Priority Data
Apr. 24, 2012  (JP) ................. 2012-098507

(51) Int. Cl.
| H01M 2/02 | (2006.01) |
| B32B 7/12 | (2006.01) |
| B32B 15/08 | (2006.01) |
| B32B 15/18 | (2006.01) |
| B32B 15/20 | (2006.01) |
| B32B 27/20 | (2006.01) |
| B32B 27/32 | (2006.01) |
| B32B 27/34 | (2006.01) |
| B32B 27/36 | (2006.01) |

(52) U.S. Cl.
CPC ...... *H01M 2/0287* (2013.01); *Y10T 428/31703* (2015.04); *B32B 7/12* (2013.01); *B32B 15/08* (2013.01); *B32B 15/18* (2013.01); *B32B 15/20* (2013.01); *B32B 27/205* (2013.01); *B32B 27/32* (2013.01); *B32B 27/34* (2013.01); *B32B 27/36* (2013.01); *B32B 2250/44* (2013.01); *B32B 2255/06* (2013.01); *B32B 2255/26* (2013.01); *B32B 2307/206* (2013.01); *B32B 2307/306* (2013.01); *B32B 2307/714* (2013.01); *B32B 2307/7242* (2013.01); *B32B 2457/00* (2013.01); *B32B 2457/10* (2013.01); *B32B 2553/00* (2013.01)

(58) Field of Classification Search
CPC .. H01M 2/0287; B23B 2553/00; B32B 15/08
USPC .................. 429/163, 211; 106/162.2; 427/58; 428/464
See application file for complete search history.

(56) References Cited

U.S. PATENT DOCUMENTS
| 2005/0103229 A1* | 5/2005 | Tanaka et al. ............... 106/162.2 |
| 2012/0148914 A1* | 6/2012 | Kim et al. ..................... 429/185 |

FOREIGN PATENT DOCUMENTS
| JP | 2001-202927 A | 7/2001 |
| JP | 2004-079402 A | 3/2004 |
| JP | 2006-040595 A | 2/2006 |
| JP | 2008-027771 A | 2/2008 |
| JP | 4081276 B2 | 4/2008 |
| JP | 2008-297595 A | 12/2008 |
| JP | 2009-084516 A | 4/2009 |

* cited by examiner

*Primary Examiner* — Cynthia H Kelly
*Assistant Examiner* — Monique Wills
(74) *Attorney, Agent, or Firm* — Keating & Bennett, LLP

(57) ABSTRACT

A laminating water-based surface treatment agent according to the present invention includes a chitosan derivative, a carboxyl compound having at least one carboxyl group in a molecule, and water. The content mass ratio of the chitosan derivative/the carboxyl compound falls within a range of 1.0/0.5 to 1.0/3.0. The laminating water-based surface treatment agent of the present invention can form an undercoating excellent in HF-resistance, electrolyte resistance, and solvent resistance, and also can sufficiently secure laminating adherence for a long term under more extreme environments required for a packaging material for a battery case or a tab lead for, e.g., a lithium ion secondary battery for automobiles.

3 Claims, 1 Drawing Sheet

LAMINATING WATER-BASED SURFACE TREATMENT AGENT, SURFACE TREATMENT METHOD AND SURFACE TREATED MATERIAL

TECHNICAL FIELD

The present invention relates to a packaging material for a battery case in which a surface treated metal layer is laminate coated, a laminating water-based surface treatment agent preferably used for a battery material such as, e.g., a tab lead, a surface treatment method, a packaging material for a battery case, and a tab lead for a battery.

TECHNICAL BACKGROUND

A lithium ion secondary battery is widely used as a power source for, e.g., laptop computers, video cameras, mobile phones, electric vehicles, and hybrid automobiles. The structure of a lithium ion secondary battery is outlined as follows. A lithium ion secondary battery is mainly constituted by, e.g., a packaging material (made of, e.g., aluminum, stainless, etc.) for a case constituting a battery main body, a tab lead (made of, e.g., aluminum, nickel, nickel plated copper, etc.) configured to extract electrons from a positive electrode, a negative electrode, and a pole plate, and a separator. As an electrolyte filled in a battery, a non-aqueous fluorine compound such as $LiPF_6$ is used, and charging and discharging are carried out by the lithium ions transmitting electrons between both poles.

Among members constituting the lithium ion secondary battery, a packaging material for a case and a tab lead are subjected to a surface treatment for the purpose of rust prevention for the members and improvement of adhesion of the laminated film and then laminate coated.

The corrosive environment inside a lithium ion secondary battery will be explained. As explained above, in a lithium ion secondary battery, a non-aqueous fluorine compound solute such as $LiPF_6$ and a non-aqueous solvent such as ethylene carbonate (EC) and dimethyl carbonate (DME) are used as an electrolyte. The fluorine compound hydrolyzes from deterioration with aging inside the battery and from a small amount of moisture mixed in the battery during the production process, and highly corrosive hydrofluoric acid (hereinafter may be referred to as "HF") is formed. A very small portion of the HF and the non-aqueous solvent penetrate inside the laminated film and finally reaches an interface of the undercoating. However, if the undercoating does not have sufficient HF-resistance and solvent resistance, problems, such as, e.g., detachment of laminated films due to dissolution of the undercoating, corrosion of members, causing leakage of electrolyte, or deterioration of charging and discharging rate, may occur. These problems are especially problematic in a secondary battery for automobiles in which extremely high safety standards are required. For that reason, it has been strongly desired that developments of an undercoating having high HF-resistance and solvent resistance.

As a laminating undercoating, a chrome-free type film is desired in view of the recent reduction of environmental burdens. In Patent Document 1, an undercoating including effective fluorine ions, zirconium ions, aluminum ions, and polyitaconic acid is disclosed. Also, in Patent Document 2, an undercoating including a basic zirconium compound, and/or a cerium compound, a carboxyl group containing resin, and an oxazoline group containing acrylic resin is disclosed. Both undercoatings have excellent early adhesion and corrosion resistance as a laminating surface treatment. However, in an environment in which HF-resistance and electrolyte resistance under high temperatures assuming the summer are required, there was a problem that the adhesion strength of the laminated film decreases when the film composition, especially the metal composition as a crosslinking agent, elutes due to HF.

Patent Document 3 discloses a laminating surface treatment agent in which a water-soluble polymer and a trivalent chromium compound are mixed at a certain ratio. Furthermore, Patent Document 4 discloses a polymer battery packaging material in which a laminated film is arranged after chromate-phosphate treatment. Trivalent chromium is contained in both of the undercoatings. However, since trivalent chromium is a crosslinking agent excellent in HF-resistance, it is possible to maintain good film adherence even in an environment in which HF exists. However, since it contains chromium, it conflicted with the current trend to reduce environmental burdens.

Patent Documents 5, 6 and 7 disclose a laminating surface treatment agent containing chitosan or its derivative as a main component. Patent Documents 5 and 6 are characterized in that metal crosslinking agents such as Zr, Ti, and Hf are contained. These metal crosslinking agents are extremely effective for accelerating polymerization of chitosan group and can give excellent initial adherence and water resistance to the undercoating. However, in the same manner as the problems in Patent Documents 1 and 2, in the HF and electrolyte, the metal crosslinking agent elutes to destruct the crosslink of the undercoating, which prevents long term maintenance of adherence of the laminated film.

Patent Document 7 relates to a tab lead material characterized in that a tab lead is subjected to a surface treatment with chitosan or chitosan derivative and then an insulating film is mounted. Patent Document 7 is characterized to improve laminated film adherence in a fluorine contained non-aqueous electrolyte. But the durability of adherence of the laminated film in an environment in which a lithium ion secondary battery used for automobiles is exposed was not sufficient, and therefore it was difficult to maintain the adherence for a long time.

Patent Document 1: Japanese Unexamined Laid-open Patent Application Publication No. 2008-297595
Patent Document 2: Japanese Unexamined Laid-open Patent Application Publication No. 2009-84516
Patent Document 3: Japanese Unexamined Laid-open Patent Application Publication No. 2004-79402
Patent Document 4: Japanese Unexamined Laid-open Patent Application Publication No. 2001-202927
Patent Document 5: Japanese Patent No. 4081276
Patent Document 6: Japanese Unexamined Laid-open Patent Application Publication No. 2006-40595
Patent Document 7: Japanese Unexamined Laid-open Patent Application Publication No. 2008-27771

DISCLOSURE OF THE INVENTION

Problems to be Solved by the Invention

The present invention aims to solve the aforementioned problems and provide a laminating water-based surface treatment agent, a surface treatment method, a packaging material for a battery case, as well as a tab lead for a battery, which are capable of forming an undercoating excellent in HF-resistance, electrolyte resistance, and solvent resistance, and also capable of sufficiently securing laminating adherence for a long term under more extreme environments required for a packaging material for a battery case or a tab lead for, e.g., a lithium ion secondary battery for automobiles.

Means to Solve the Problems

To achieve the aforementioned objects, the present invention provides the following means.

[1] A laminating water-based surface treatment agent comprising:
a chitosan derivative;
a carboxylic compound having at least one carboxyl group in a molecule; and
water,
wherein a content mass ratio of the chitosan derivative/the carboxyl compound falls within a range of 1.0/0.5 to 1.0/3.0.

[2] The laminating water-based surface treatment agent as recited in the aforementioned Item 1,
wherein the chitosan derivative is at least one type of chitosan derivative selected from the group consisting of carboxymethyl chitosan, cationized chitosan, hydroxyalkyl chitosan, glyceryl chitosan, and acid salts of these chitosan, and
wherein a substituent introduction rate in the chitosan derivative is 0.3 to 3.0 pieces per chitosan monomer unit, and a weight-average molecular weight of the chitosan derivative is 10,000 to 1,000,000.

[3] The laminating water-based surface treatment agent as recited in the aforementioned Item 1 or 2, further comprising at least one type of a coupling agent component selected from the group consisting of a silane coupling agent and a hydrolysate thereof, and
wherein a content mass ratio of the chitosan derivative/the coupling agent component falls within the range of 1.0/0.01 to 1.0/0.1.

[4] A laminating surface treatment method comprising:
applying the water-based surface treatment agent as recited in any one of the aforementioned Items 1 to 3 to a surface of a metal material; and thereafter
drying by heating the metal material at a temperature of 60 to 300° C. to form an undercoating.

[5] The laminating surface treatment method as recited in the aforementioned Item 4, wherein a formed amount of the undercoating after the drying is 1 to 500 mg/m$^2$.

[6] A laminating surface treated material comprising:
a metal layer in which an undercoating is formed on at least one surface of a metal plate,
wherein the undercoating is a film formed by treating at least one surface of the metal plate with the water-based surface treatment agent as recited in any one of the aforementioned Items 1 to 3.

[7] A packaging material for a battery case, comprising:
a metal layer in which an undercoating is formed on at least one surface of a metal plate,
wherein the undercoating is a film formed by treating at least one surface of the metal plate with the water-based surface treatment agent as recited in any one of the aforementioned Items 1 to 3.

[8] A packaging material for a battery case, comprising:
a heat resistant resin stretched film layer as an outer layer;
a thermoplastic resin unstretched film layer as an inner layer; and
a metal layer arranged between the outer layer and the inner layer,
wherein the metal layer is formed by a metal plate having an undercoating formed at least on an inner layer side surface of the metal plate, and
wherein the undercoating is a film formed by treating at least an inner layer side surface of the metal plate with the water-based surface treatment agent as recited in any one of the aforementioned Items 1 to 3.

[9] A tab lead for a battery, comprising:
a metal layer in which an undercoating is formed on at least one surface of a metal plate,
wherein the undercoating is a film formed by treating at least one surface of the metal plate with the water-based surface treatment agent as recited in any one of the aforementioned Items 1 to 3.

[10] A tab lead for a battery, comprising:
a metal layer; and
an insulation tab film laminated on both sides of the metal layer,
wherein the metal layer is formed by a metal plate having an undercoating formed at least on one surface of the metal plate, and
wherein the undercoating is a film formed by treating at least one surface of the metal plate with the water-based surface treatment agent as recited in any one of the aforementioned Items 1 to 3.

Effects of the Invention

The undercoating treated with the laminating water-based surface treatment agent according to the inventions [1] to [3] and formed on a metal surface has a characteristic that it does not easily dissolve when it comes in contact with HF and/or electrolyte. Therefore, by using the surface treatment agent of the present invention for forming a laminating undercoating used for a packaging material for a lithium ion secondary battery and a tab lead, the initial laminating adherence can be sufficiently secured and excellent secondary adherence performance when it comes in contact with HF and electrolyte can be secured. That is, even under an environment in which it is in contact for a long time with HF and electrolyte such as a lithium ion secondary battery, good laminating adherence for, e.g., a packaging material for a battery case and tab lead, can be maintained for a long time.

In the invention [4], after the water-based surface treatment agent according to any of the inventions [1] to [3] is applied to the surface of a metal material, an undercoating is formed by drying by heating it at a temperature of 60 to 300° C. Therefore, an undercoating hard to be dissolved even in contact with HF and electrolyte can be formed.

In the invention [5], since the formed amount of the undercoating after the drying is 1 to 500 mg/m$^2$, an undercoating sufficiently having the characteristic to not dissolve in contact with HF and electrolyte can be formed.

In the invention [6], a laminating surface treated material, which is excellent in HF-resistance, electrolyte resistance, and solvent resistance, and is capable of sufficiently obtaining initial laminating adherence and sufficiently securing secondary adherence in a long term when coming into contact with HF and electrolyte can be provided.

In the inventions [7] and [8], a packaging material for a battery case, which is excellent in HF-resistance, electrolyte resistance, and solvent resistance, and is capable of sufficiently obtaining initial laminating adherence and sufficiently securing secondary adherence in a long term when coming into contact with HF and electrolyte can be provided.

In the inventions [9] and [10], a tab lead for a battery, which is excellent in HF-resistance, electrolyte resistance, and solvent resistance, and is capable of sufficiently obtaining initial laminating adherence and sufficiently securing secondary adherence in a long term when coming into contact with HF and electrolyte can be provided.

PREFERRED EMBODIMENTS FOR CARRYING OUT THE INVENTION

Figure 1:
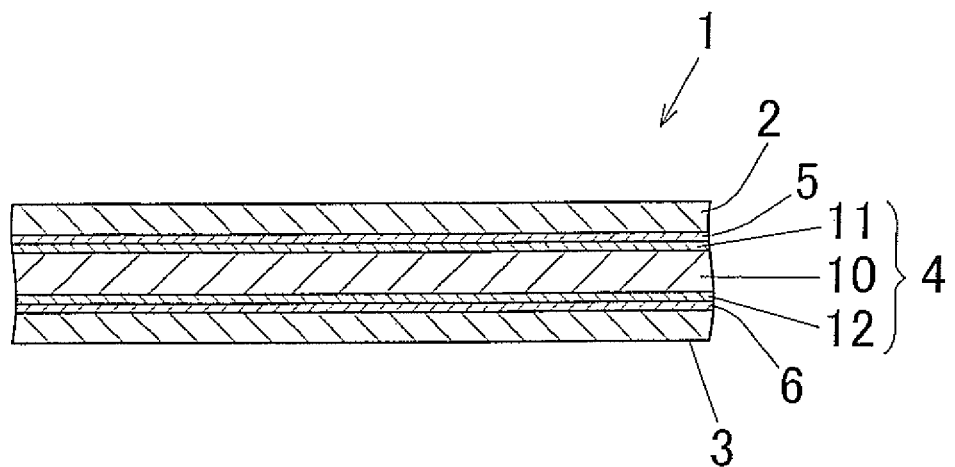
FIG. 1 is a cross-sectional view showing an embodiment of a packaging material for a battery case according to the present invention.

First, a chitosan derivative (hereinafter may be referred to as "component A") contained in a water-based surface treatment agent (aqueous surface treatment agent) will be explained. The chitosan derivative used in the present invention is obtained from chitosan as a starting material, which is a substance obtained from a 60 to 100 mol % deacetylated chitin which is a natural polymer extracted from crustaceans such as crabs, shrimps, etc. For example, 100 mol % deacetylated chitosan is a high polymeric material in which N-acetyl-β-D-glucosamines are bonded at the first and fourth carbons.

The chitosan derivative is a reaction product in which hydroxyl group and/or amino group of chitosan is carboxylated, glycolized, tosylated, sulfated, phosphorylated, etherified, or alkylated. Specifically, chitosan, carboxymethyl chitosan, hydroxyethyl chitosan, hydroxypropyl chitosan, hydroxybutyl chitosan, glyceryl chitosan, and acid salts of these chitosan can be exemplified.

Also, the chitosan derivative can be a reaction product in which a tertiary or quaternary amino group is newly introduced into a chitosan using a tertiary or quaternary amino group or a compound having both of them, or the so-called cationized chitosan having a tertiarized or quaternized amino group or both of them obtained by directly alkylating an amino group of the chitosan with an alkylating agent in a molecule, or acid salts of these chitosan.

Among the aforementioned chitosan derivatives, in view of the HF-resistance, electrolyte resistance and laminating adherence, a glyceryl chitosan and/or an acid salt of this chitosan is especially recommended. The synthesis method, conditions, etc., of the chitosan derivative can be any conventionally known methods and conditions. The glyceryl chitosan is a substance recited in Japanese Unexamined Laid-open Patent Application Publication No. S59-8701, and can be obtained by reacting, e.g., chitosan and glycidol (1,2-epoxypropanol-3) at an appropriate ratio. The "glyceryl chitosan," otherwise known as "dihydroxypropyl chitosan," can be obtained from the market and used in the present invention.

To give good lamination adherence in a corrosive environment in contact with non-aqueous fluorine compounds such as inside of a lithium ion secondary battery, the combination ratio of chitosan derivatives and carboxylated compounds, the substituent introduction rate of the chitosan derivatives, and the weight average molecular weight of the chitosan derivative are extremely important factors.

The substituent introduction rate shows an average value of the number of substituent introductions per chitosan monomer unit (N-acetyl-β-D-glucosamine) (which sometimes includes the number of decimal place since the substituent introduction rate is an average value). The substituent introduction rate is preferably within 0.3 to 3.0 pieces per chitosan monomer unit (N-acetyl-β-D-glucosamin). Higher the substituent introduction rate, the laminating adherence due to the polar effect by the substituent group improves. However, when the substituent introduction rate exceeds 3.0 pieces per monomer unit, the HF-resistance decreases because the water solubility of the undercoating excessively rises, resulting in a decreased laminating adherence in an electrolyte. When the substituent introduction rate is less than 0.3 pieces per monomer unit, the water solubility of the undercoating weakens, which enhances the HF-resistance of the undercoating. On the other hand, however, improvement of the laminating adherence due to the polar effect of the substituent cannot be expected. As a result, the laminating adherence in the electrolyte decreases. Therefore, the substituent introduction rate is preferred to be set within a range of 0.3 to 3.0 pieces per chitosan monomer unit.

The weight average molecular weight of the chitosan derivative is preferably within a range of 10,000 to 1,000,000. When the weight average molecular weight is under 10,000, the toughness of the undercoating formed by using the surface treatment agent of the present invention becomes insufficient. Therefore, in a packaging material for a battery case which is molded after laminating processing, the undercoating cannot follow the processing, resulting in decreased laminating adherence. On the other hand, when the weight average molecular weight exceeds 1,000,000, the viscosity of the obtained water-based surface treatment agent becomes too high, deteriorating the workability. For this reason, the concentration of the chitosan derivative in the surface treatment agent has to be kept low.

As a compound having the tertiarized or quarternized amino group, for example, 2-chloroethyl diethylamine or its hydrochloride, 3-chloro-2-hydroxypropyl diethylamine, 2,3-epoxypropyl dimethylamine, trimethyl-3-chloro-2-hydroxypropyl trimethyl ammonium chloride, and 2,3-epoxypropyl trimethyl ammonium chloride can be exemplified. As the alkylating agent to directly alkylate the amino group, for example, methyl iodine and ethyl iodine can be exemplified.

The carboxyl compound contained in the surface treatment agent of the present invention (hereinafter may be referred to as "component B") functions as a crosslinking agent for the chitosan derivative that is the main component of the undercoating, and assumes a role to accelerate the polymerization of the chitosan group that is the main component of the undercoating and improve the barrier performance. For that reason, the number of the carboxyl group included in the carboxyl compound must be at least one. It is preferred that, in view of improving the HF-resistance of the undercoating, two or more carboxyl groups are included. As such carboxyl compound, for example, acetic acid, oxalic acid, malonic acid, malic acid, tartaric acid, mellitic acid, adipic acid, succinic acid, maleic acid, phthalic acid, sebacic acid, citric acid, butanetricarboxylic acid, propanetricarboxylic acid, trimellitic acid, ethylenediaminetetracarboxylic acid, 1,2,3,4-butanetetracarboxylic acid, diethylenetriamine-pentaacetic acid, tannic acid, phytic acid, polyacrylic acid, and polymethacrylic acid can be exemplified, but not especially limited to them.

In the present invention, the undercoating is finally formed into a film having excellent HF-resistance and electrolyte resistance by esterification reaction of the hydroxyl group in the chitosan derivative and the carboxyl group in the carboxyl compound during the drying by heating to be polymerized. On the other hand, the hydroxyl group in the chitosan derivative also functions to improve the adherence of the metal material and the laminated film by the polar effect by being preferentially coordinated on the metal material side and the laminated film side. Therefore, to balance the HF-resistance, the electrolyte resistance, and the laminating adherence of the undercoating, the compounding ratio of the chitosan derivative and the carboxyl compound is important. In the present invention, the compounding ratio of the chitosan derivative and the carboxyl compound is set to fall within the range of chitosan derivative/carboxyl compound=1.0/0.5 to 1.0/3.0 in mass ratio. When the carboxyl compound exceeds 3.0 with respect to chitosan derivative 1.0, the crosslinking of the chitosan derivative progresses and the HF-resistance of the undercoating improves because the amount of unreacted hydroxyl group decreases, but the adherence of the laminated film decreases. On the other hand, when the carboxyl compound becomes less than 0.5 with respect to the chitosan derivative 1.0, the initial laminating adherence improves because the remaining amount of the hydroxyl group in the chitosan derivative increases, but the HF-resistance deteriorates because of insufficiency of crosslinking in the undercoating, and the laminating adherence in the HF and the electrolyte deteriorates.

In the surface treatment agent of the present invention, in addition to the chitosan derivative and the carboxyl compound, at least one type of coupling agent component (hereinafter may be referred to as "component C") selected from the group consisting of a silane coupling agent and its hydrolysate can be mixed. The coupling agent component that can be used is not especially limited, but, for example, γ-aminopropyltrimethoxy silane, γ-aminopropyltriethoxy silane, N-phenyl-3-propyltrimethoxy silane, N-phenyl-3-propyltriethoxy silane, N-(2-aminoethyl)aminopropyltrimethoxy silane, N-(2-aminoethyl)aminopropylmethyldimethoxy silane, N-(2-aminoethyl)aminopropyltriethoxy silane, N-(2-aminoethyl)aminopropylmethyldiethoxy silane, N-(2-aminoethyl)aminopropylmethyldimethoxy silane, γ-methacryloxypropyltrimethoxy silane, γ-methacryloxypropylmethyldimethoxy silane, γ-methacryloxypropyltriethoxy silane, γ-methacryloxypropylmethyldiethoxy silane, N-β-(N-vinylbenzylaminoethyl)-β-aminopropyltrimethoxy silane, N-β-(N-vinylbenzylaminoethyl)-β-aminopropylmethyldimethoxy silane, N-β-(N-vinylbenzylaminoethyl)-3-aminopropyltriethoxy silane, N-β-(N-vinylbenzylaminoethyl)-3-aminopropylmethyldiethoxy silane, γ-glycidoxypropyltrimethoxysilane, γ-glycidoxypropylmethyldimethoxysilane, γ-glycidoxypropyltriethoxy silane, γ-glycidoxypropylmethyldiethoxy silane, γ-mercaptopropyltrimethoxysilane, γ-mercaptopropylmethyldimethoxysilane, γ-mercaptopropyltriethoxysilane, γ-mercaptopropylmethyldiethoxysilane, methyltrimethoxysilane, dimethyldimethoxysilane, methyltriethoxysilane, dimethyldiethoxysilane, vinyltriacetoxysilane, γ-chloropropyltrimethoxysilane, γ-chloropropylmethyldimethoxysilane, γ-chloropropyltriethoxysilane, γ-chloropropylmethyldiethoxysilane, hexamethyldisilazane, γ-anilinopropyltrimethoxysilane, γ-anilinopropylmethyldimethoxysilane, γ-anilinopropyltriethoxysilane, γ-anilinopropylmethyldiethoxysilane, isocyanatepropyltrimethoxysilane, isocyanatepropyltriethoxysilane, ureidopropyltriethoxysilane, bis(trimethoxysilyl)aminovinyltrimethoxysilane, vinylmethyldimethoxysilane, vinyltriethoxysilane, vinylmethyldiethoxysilane, octadimethyldimethyl [3-(trimethoxysilyl) propyl]ammoniumchloride, octadecyldimethyl [3-(methyldimethoxysilyl) propyl]ammonium chloride, octadecyldimethyl [3-(triethooxysilyl) propyl]ammonium chloride, octadecyldimethyl [3-(methyldiethoxysilyl) propyl]ammonium chloride, γ-chloropropylmethyldimethoxysilane, γ-mercaptopropylmethyldimethoxysilane, methyltrichlorosilane, dimethyldichlorosilane, trimethylchlorosilane and their hydrolysates can be exemplified.

The compounding ratio of the chitosan derivative and the coupling agent component in the surface treatment agent is preferably within the range of chitosan derivative/coupling agent component=1.0/0.01 to 1.0/0.1 in mass ratio. The aforementioned coupling agent component functions as a crosslinking agent to the chitosan derivative. As in the same manner as the aforementioned carboxyl compound, if the coupling agent component is less than 0.1 with respect to the chitosan derivative 1.0, the functions as a crosslinking agent cannot be sufficiently expected. Even if the coupling agent component exceeds 0.1 with respect to the chitosan derivative 1.0, the effect also saturates, and therefore it is economically disadvantageous.

The solvent of the water-based surface treatment agent (aqueous surface treatment agent) of the present invention is water, but a non-aqueous solvent can be added for the purpose of improving the coating and drying performance. The type of the non-aqueous solvent is not specifically limited, but it is preferable to use an aqueous solvent, such as, e.g., alcohol, ketone, cellosolve, etc. It is also preferred that the solvent volatilizes from the undercoating during the drying process, so it is more preferred that a non-aqueous solvent having a lower boiling point than the drying temperature is selected.

For the purpose of improving the coating performance, at least one type of a surfactant agent selected from the group consisting of a nonionic group surfactant, an anionic group surfactant, and a cationic group surfactant can be added to the water-based surface treatment agent of the present invention at a concentration in a range to not interfere with the polymerization of the undercoating.

The method of applying the water-based surface treatment agent of the present invention to a processing material, i.e., a material to be processed, (a metal material such as a metal plate) is not specifically limited as long as the method can evenly apply the agent. For example, a roll coating method, a spin coating method, an immersion method, and a spray method can be exemplified. The drying temperature after the coating is preferably 60 to 300° C., more preferably 80 to 250° C. Also, the heat supplying source is not specifically limited. For example, electricity, gas, and infrared rays can be exemplified. If the drying temperature is lower than 60° C., the polymerization of the undercoating becomes insufficient, deteriorating the HF-resistance. On the other hand, if the drying temperature becomes higher than 300° C., there is no problem in the function as an undercoating, but it is economically disadvantageous.

The film formed amount of the undercoating formed on the surface of the processing material (a metal material such as a metal plate) is preferably 1 to 500 mg/m$^2$ for the entire film amount. If it is less than 1 mg/m$^2$, the barrier performance against HF and electrolytes decreases. If it exceeds 500 mg/m$^2$, although there will be no problems in function, it is economically disadvantageous. The adjustment to the film amount can be done by adjusting the concentration of the surface treatment agent and the applied amount before drying.

Whether or not the undercoating formed on the surface of the processing material (a metal material such as a metal plate) has properly formed and the predetermined film has formed can be confirmed by, e.g., a surface analyzer such as an infrared absorption spectrophotometry. Also, whether or not a predetermined film amount is obtained can be determined by a method in which the predetermined film amount is calculated from the mass difference before and after the processing or by a surface carbon analyzer.

The materials to be processed by the surface treatment agent of the present invention are, e.g., a metal plate for a packaging material for a case constituting a battery such as a lithium ion secondary battery, and a metal plate for a tab lead. As a material of a metal plate for a packaging material for a battery case, for example, aluminum and stainless steel can be exemplified. As a metal material for a metal plate of a tab lead, for example, aluminum, nickel, and nickel plated copper can be exemplified. The water-based surface treatment agent and the surface treatment method of the present invention can be applied to these metal plates.

In using the water-based surface treatment agent and executing the surface treatment method of the present invention, in cases where the surface of the processing material (a metal plate, etc.) is polluted with, e.g., rust preventive oil or rolling oil, the surface needs to be cleaned. The cleaning method is not specifically limited, but solvent degreasing, alkaline degreasing, and acid cleaning can be exemplified. After the cleaning, a rinsing step is needed to remove the cleaning agent adhered to the surface of the processing material.

The processing material (e.g., a metal layer in which an undercoating is formed on at least one surface of a metal plate) treated with the surface treatment method of the present invention is laminate coated. The laminating method is not specifically limited, but either a dry laminating method or a heat laminating method can be used. The material for the laminating film is not specifically limited as long as t has excellent HF-resistance and gas barrier performance. For example, polyester resin, polyethylene resin, polypropylene resin, polycarbonate resin, polyvinyl alcohol resin, polyvinyl acetal resin, polyamide resin, polyvinyl acetate resin and polyimide resin can be exemplified. In the dry laminating method, normally, a laminated film is adhered via an adhesive agent layer. The adhesive agent is not specifically limited, but, e.g., a urethane group adhesive agent and an acrylic group adhesive agent can be exemplified.

In the undercoating to be formed by applying the water-based surface treatment agent of the present invention, HF-resistance and electrolyte resistance are given by blending carboxyl compounds to chitosan derivative at the aforementioned predetermined ratio and also enhanced in adherence between the metal material and the laminated film by the polar effect of the hydroxyl group. Furthermore, by regulating the substituent introduction rate and the weight-average molecular weight of the chitosan derivative within their respective predetermined preferable range, the HF-resistance and electrolyte resistance of the undercoating can be sufficiently improved. Also, the surface treatment agent of the present invention can combine a coupling agent component (silane coupling agent and hydrolysate of silane coupling agent), which can exert the aforementioned effects more sufficiently. With the undercoating formed by applying the water-based surface treatment agent of the present invention, even under an environment in which it is exposed to HF and electrolyte for a long time such as a lithium ion secondary battery, excellent laminating adherence can be maintained for a long time.

Next, an embodiment of a packaging material 1 for a battery case according to the present invention is shown in FIG. 1. This packaging material is used as a battery case. The packaging material 1 for a battery case of the present invention includes: a heat resistant resin stretched film layer 2 as an outer layer; a thermoplastic resin unstretched film layer 3 as an inner layer; and a metal layer 4 arranged between both the film layers 2 and 3. The metal layer 4 has a structure in which an undercoating 12 is formed on at least one side of the inner layer side of the metal plate 10.

Thus, in this embodiment, the aforementioned packing material 1 for a battery case has a structure in which a heat resistant resin stretched film layer (outer layer) 2 is integrally laminated on the upper surface of an aluminum layer 4 including undercoatings 11 and 12 formed on both surfaces of an aluminum plate 10 via a first adhesive agent layer 5 (on top of the undercoating 11), and a thermoplastic resin unstretched film layer (inner side layer) 3 is integrally laminated on the lower surface of the aluminum layer 4 (under the undercoating 12) via a second adhesive agent layer 6.

The heat resistant resin stretched film layer (outer layer) 2 is a member that mainly functions to secure good formability as a packaging material. That is, it functions to prevent breaking due to necking of the aluminum plate during forming. The heat resistance resin stretched film 2 is not specifically limited, but it is preferred to use a stretched film made of polyamide or polyester. The thickness of the heat resistant resin stretched film layer 2 is preferably set to 9 to 100 µm. If the thickness is less than 9 µm, it is not preferable because the stretching of the stretched film is not sufficient for sharp forming, so necking of the aluminum plate is likely to occur and forming defects occur. It is also not preferable if the thickness exceeds 100 µm because it only increases the amount of resin used without further improving formability.

The thermoplastic resin unstretched film layer (inner layer) 3 assumes a role to give excellent chemical resistance against strongly corrosive electrolyte used for, e.g., lithium ion secondary battery and to give heat sealing properties to the packaging material. The thermoplastic resin unstretched film 3 is not specifically limited, but it is preferable to use an unstretched film made of at least one type of thermoplastic resin selected from the group consisting of polyethylene, polypropylene, olefin group copolymer and their acid modifications, and ionomers. The thickness of the thermoplastic resin unstretched film layer 3 is preferred to be set to 9 to 100 µm. If the thickness is less than 9 µm, it is not preferred because it becomes too thin and there is a concern that pinholes may be generated. It is also not preferred that the thickness exceeds 100 µm because it only increases the amount resin used. Among them, the thickness of the thermoplastic resin unstretched film layer (inner layer) 3 is especially preferred to be set to 20 to 90 µm.

In addition, the outer layer 2 and the inner layer 3 each can be a single layer or a plurality of layers.

The metal layer 4 assumes the role of giving gas barrier properties to prevent the intrusion of oxygen and moisture to the packaging material, and has a structure in which undercoatings 11 and 12 are formed on both surfaces of the metal plate 10.

The metal plate 10 is not specifically limited, but, for example, an aluminum plate and a stainless steel plate can be exemplified. The thickness of the metal plate 10 is preferably set to 10 to 100 µm.

The undercoatings 11 and 12 are films formed by treating one surface or both surfaces of the aforementioned metal plate 10 with the water-based surface treatment agent of the present invention. That is, the undercoatings 11 and 12 are formed by treating one or both surfaces of the metal plate 10 with a water-based surface treatment agent containing a chitosan derivative, a carboxyl compound having at least one carboxyl group within a molecule, and water, the contained mass ratio of the chitosan derivative/the carboxyl compound being within the range of 1.0/0.5 to 1.0/3.0.

In the aforementioned embodiment, the structure in which the undercoatings 11 and 12 are formed on both surfaces of the metal plate 10 is employed, but the structure is not specifically limited to that. For example, a structure in which the undercoating 12 is formed on one surface of the inner layer 3 side of the metal plate 10 can be employed.

The first adhesive agent layer 5 is not specifically limited. It is, however, preferable that the first adhesive agent layer 5 is a urethane group adhesive agent layer formed with a urethane group two-component reaction type adhesive agent, which enables sufficiently sharp forming by deep-drawing or bulging (stretch forming).

The second adhesive agent layer 6 is not specifically limited. For example, as the second adhesive agent layer 6, an acid modified polypropylene layer, a urethane-series adhesive agent layer, and an acrylic-series adhesive agent layer can be exemplified. The acid modified polypropylene is not specifically limited. It is preferable to use maleic anhydride modified polypropylene as acid modified polypropylene.

A battery case can be obtained by deep-drawing or bulging the packaging material 1 for a battery case of the present invention.

Figure 2:
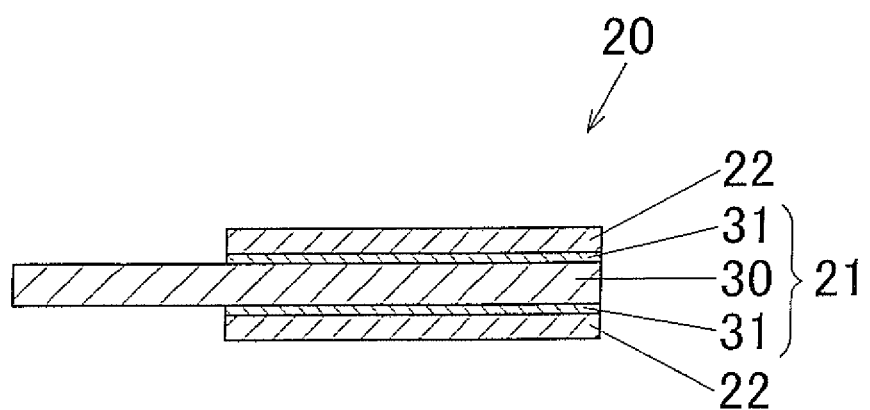
FIG. 2 is a cross-sectional view showing another embodiment of a tab lead for a battery according to the present invention.

Next, an embodiment of a tab lead 20 for a battery according to the present invention is shown in FIG. 2. The tab lead 20 includes a metal layer 21, insulating tab films 22 and 22 laminated on both sides of the metal layer 21, and the metal layer 21 has a structure in which an undercoating 31 is formed on at least one surface of a metal plate 30.

In the present embodiment, the tab lead 20 has a structure in which the insulating tab films 22 and 22 are integrally laminated on both surfaces of the metal layer 21 in which undercoatings 31 and 31 are formed on both surfaces of the metal plate 30.

The metal plate 30 is not specifically limited, but, for example, an aluminum plate, a nickel plate and a nickel plated copper plate can be exemplified. The thickness of the metal plate 30 is preferably set to 0.1 to 1 mm.

The insulating tab film 22 is not specifically limited, but, for example, a polyethylene film and a polypropylene film can be exemplified. The thickness of the insulating tab film 22 is preferably set to 50 to 250 μm.

The undercoating 31 is formed by treating one surface or both surfaces of the metal plate 30 with the water-based surface treatment agent of the present invention. That is, the undercoating 31 is formed by treating one surface or both surfaces of the metal plate 30 with a water-based surface treatment agent containing a chitosan derivative, a carboxyl compound having at least one carboxyl group in a molecule, and water, the contained mass ratio of the chitosan derivative/carboxyl compound being within the range of 1.0/0.5 to 1.0/3.0.

The embodiment has a structure in which undercoatings 31 and 31 are formed on both surfaces of the metal plate 30, but can have a structure in which an undercoating 31 is formed on one surface of the metal plate 30.

EXAMPLES

Next, specific Examples of the present invention will be explained. It should be, however, noted that the present invention is not specifically limited to these Examples.
<Production of Test Plate>
As a test plate, an aluminum plate (JIS A1050, plate thickness: 0.2 mm, plate size: 50 mm×100 mm), a nickel plated copper plate (plate thickness: 0.2 mm, plate size: 50 mm×100 mm), a copper plate (plate thickness: 0.2 mm, plate size: 50 mm×100 mm), a tin plated copper plate (plate thickness: 0.2 mm, plate size: 50 mm×100 mm), and a stainless steel plate (JIS SUS304, plate thickness: 0.2 mm, plate size: 50 mm×100 mm) were used. All of the test plates were degreased by spraying a 2% water solution of a commercial alkaline degreasing agent (Nihon Parkerizing Co., FINECLEANER E6404) for 10 seconds at 50° C. and then the surfaces were rinsed and cleaned.
<Surface Treatment (Forming Undercoating)>
A surface treated plate (a metal plate having undercoatings thereon) was obtained by applying a wet coating amount of 2 g/m² of each surface treatment agent shown in Table 1 (Examples 1 to 17, Comparative Examples 1 to 5) using a roll coater on a test plate cleaned by alkaline degreasing (the film amount at the time of drying was the amount as recited in Table 1) and by drying under a condition in which the plate temperature became the predetermined temperature (drying temperature as shown in Table 1) in a heat drying furnace.
<Production Method of Laminated Film (Laminate Coating to Surface Treated Plate)>
A laminated film was obtained by heat laminating a thermoplastic polypropylene unstretched film (thickness 15 μm) on the undercoating formed surface of the aforementioned surface treated plate via an acid modified polypropylene layer under the condition of 180° C., 10 seconds, and surface pressure 50 kg/cm².
<Evaluation of HF-Resistance of Undercoating>
The HF resistance of the undercoating was evaluated by immersing the surface treated nickel plated copper plate (not laminate coated) in a 0.1% HF water solution for one hour at room temperature and measuring the remaining rate of the film after the immersion. The film amount was measured by measuring the carbon deposition amount using a total organic carbon meter (Model TOC-5000) and a solid sample combustion apparatus (SSM-5000A) manufactured by Shimadzu Corporation.

The film remaining rate (%)=(carbon deposition amount after HF immersion/carbon deposition amount before HF immersion)×100

⊚: film remaining rate 90% or more
○: film remaining rate 70% or more, but under 90%
Δ: film remaining rate 50% or more, but under 70%
x: film remaining rate under 50%<
<Method of Evaluation of Workability (Initial Adhesion) of Laminated Film>
The workability of the laminated film (initial adhesion) was evaluated by, using an aluminum plate (JIS A1050) and a stainless steel plate (JIS SUS304) as a test plate, subjecting each test plate to the aforementioned surface treatment (undercoating forming), and laminate coating, and then performing a deep drawing test. The processing conditions and evaluation methods were as follows. A punched out test plate having a diameter of 160 mm was drawn (first drawing) into a cup having a diameter of 100 mm. Next, the cup was drawn again (second drawing) into a diameter of 75 mm, and further drawn into a diameter of 65 mm (third drawing) to produce a can. The ironing rate in each processing step (thinning) was: 5% for the first drawing; 15% for the second drawing; and 15% for the third drawing. The formed can was evaluated for workability and initial adherence under the following standards. The products that obtained ⊚ and ○ for evaluation results under the following standards are at actually usable levels.
⊚: a can was produced and there was no detachment of film
○: a can was produced, but a slightly small portion of the film was detached
Δ: a can was produced, but a portion of the film was detached
x: the film was broken
<Evaluation of Secondary Adherence of Laminated Film>
The laminated film obtained by subjecting an aluminum plate, a copper plate, a nickel plated copper plate, and a tin plated copper plate as a test plate to the aforementioned surface treatment (undercoating forming) and laminate coating was immersed in a 1% HF water solution for 48 hours at room temperature to evaluate the secondary adherence of the laminated film. Also, the laminated film was immersed in an electrolyte of 85° C. (LiPF$_6$ with a concentration of 1M, mixture of 1:1 parts of diethylcarbonate and ethylcarbonate as the solvent, and water added at a concentration of 10 mg/L for a stimulatory effect) for one month, and the secondary adherence of the laminated film was evaluated. The evaluation standards are shown below. The products that obtained ⊚ and ○ for evaluation results under the following standards are at actually usable levels.

⊚: there was no detachment of the polypropylene film
○: a slight portion of the polypropylene film was detached
Δ: a portion of the polypropylene film was detached
x: the polypropylene film was broken

Example 1

A surface treatment agent was produced by mixing 10 mass parts of hydroxyalkyl chitosan (component A), 15 mass parts of butane tricarboxylic acid (component B), and 975 mass parts of water. This surface treatment agent was applied to the processing material (test plate) by a roll coating method so that the film amount after drying became 50 mg/m$^2$ and dried at 200° C. to form the undercoating and obtain the surface treated plate (a metal plate with undercoatings formed thereon). The weight average molecular weight of the hydroxyalkyl chitosan was 100,000, the substituent introduction rate of the chitosan per monomer unit was 1.5 pieces, and the mixed mass ratio for each component was component A/component B=1.0/1.5.

Example 2

A surface treatment agent was produced by mixing 10 mass parts of glyceryl chitosan (component A), 15 mass parts of butane tricarboxylic acid (component B), and 975 mass parts of water. This surface treatment agent was applied to the processing material (test plate) by a roll coating method so that the film amount after drying became 50 mg/m$^2$ and dried at 200° C. to form the undercoating and obtain the surface treatment plate (a metal plate with undercoating formed thereon). The weight average molecular weight of the glyceryl chitosan was 100,000, the substituent introduction rate of the chitosan per monomer unit was 1.5 pieces, and the mixed mass ratio for each component was component A/component B=1.0/1.5.

Example 3

A surface treatment agent was produced by mixing 10 mass parts of carboxymethyl chitosan (component A), 15 mass parts of butane tricarboxylic acid (component B), and 975 mass parts of water. This surface treatment agent was applied to the processing material (test plate) by a roll coating method so that the film amount after drying became 50 mg/m$^2$ and dried at 200° C. to form the undercoating and obtain the surface treatment plate (a metal plate with undercoatings formed thereon). The weight average molecular weight of the carboxymethyl chitosan was 100,000, the substituent introduction rate of the chitosan per monomer unit was 1.5 pieces, and the mixed mass ratio for each component was component A/component B=1.0/1.5.

Example 4

A surface treatment agent was produced by mixing 16.7 mass parts of glyceryl chitosan (component A), 8.3 mass parts of butane tricarboxylic acid (component B), and 975 mass parts of water. This surface treatment agent was applied to the processing material (test plate) by a roll coating method so that the film amount after drying became 50 mg/m$^2$ and dried at 200° C. to form the undercoating and obtain the surface treatment plate (a metal plate with undercoatings formed thereon). The weight average molecular weight of the glyceryl chitosan was 100,000, the substituent introduction rate of the chitosan per monomer unit was 1.5 pieces, and the mixed mass ratio for each component was component A/component B=1.0/0.5.

Example 5

A surface treatment agent was produced by mixing 6.3 mass parts of glyceryl chitosan (component A), 18.7 mass parts of butane tricarboxylic acid (component B), and 975 mass parts of water. This surface treatment agent was applied to the processing material (test plate) by a roll coating method so that the film amount after drying became 50 mg/m$^2$ and dried at 200° C. to form the undercoating and obtain the surface treatment plate (a metal plate with undercoatings formed thereon). The weight average molecular weight of the glyceryl chitosan was 100,000, the substituent introduction rate of the chitosan per monomer unit was 1.5 pieces, and the mixed mass ratio for each component was component A/component B=1.0/3.0.

Example 6

A surface treatment agent was produced by mixing 10 mass parts of glyceryl chitosan (component A), 15 mass parts of 1,2,3,4-butane tetracarboxylic acid (component B), and 975 mass parts of water. This surface treatment agent was applied to the processing material (test plate) by a roll coating method so that the film amount after drying became 50 mg/m$^2$ and dried at 200° C. to form the undercoating and obtain the surface treatment plate (a metal plate with undercoatings formed thereon). The weight average molecular weight of the glyceryl chitosan was 100,000, the substituent introduction rate of the chitosan per monomer unit was 0.5 pieces, and the mixed mass ratio for each component was component A/component B=1.0/1.5.

Examples 7

A surface treatment agent was produced by mixing 10 mass parts of glyceryl chitosan (component A), 15 mass parts of 1,2,3,4-butane tetracarboxylic acid (component B), and 975 mass parts of water. This surface treatment agent was applied to the processing material (test plate) by a roll coating method so that the film amount after drying became 50 mg/m$^2$ and dried at 200° C. to form the undercoating and obtain the surface treatment plate (a metal plate with undercoatings formed thereon). The weight average molecular weight of the glyceryl chitosan was 100,000, the substituent introduction rate of the chitosan per monomer unit was 3.0 pieces, and the mixed mass ratio for each component was component A/component B=1.0/1.5.

Examples 8

A surface treatment agent was produced by mixing 9.8 mass parts of glyceryl chitosan (component A), 14.7 mass parts of butane tricarboxylic acid (component B), 0.5 mass parts of γ-aminopropyltriethoxysilane (component C) and 975 mass parts of water. This surface treatment agent was applied to the processing material (test plate) by a roll coating method so that the film amount after drying became 50 mg/m² and dried at 200° C. to form the undercoating and obtain the surface treatment plate (a metal plate with undercoatings formed thereon). The weight average molecular weight of the glyceryl chitosan was 100,000, the substituent introduction rate of the chitosan per monomer unit was 1.5 pieces, and the mixed mass ratio for each component was component A/component B=1.0/1.5 and component A/component C=1.0/0.05.

Example 9

A surface treatment agent was produced by mixing 10 mass parts of carboxymethyl chitosan (component A), 15 mass parts of citric acid (component B), and 975 mass parts of water. This surface treatment agent was applied to the processing material (test plate) by a roll coating method so that the film amount after drying will be 50 mg/m² and dried at 200° C. to form the undercoating and obtain the surface treatment plate (a metal plate with undercoatings formed thereon). The weight average molecular weight of the carboxymethyl chitosan was 10,000, the substituent introduction rate of the chitosan per monomer unit was 1.5 pieces, and the mixed mass ratio for each component was component A/component B=1.0/1.5.

Example 10

A surface treatment agent was produced by mixing 10 mass parts of carboxymethyl chitosan (component A), 15 mass parts of citric acid (component B), and 975 mass parts of water. This surface treatment agent was applied to the processing material (test plate) by a roll coating method so that the film amount after drying became 50 mg/m² and dried at 200° C. to form the undercoating and obtain the surface treatment plate (a metal plate with undercoatings formed thereon). The weight average molecular weight of the carboxymethyl chitosan was 1,000,000, the substituent introduction rate of the chitosan per monomer unit was 1.5 pieces, and the mixed mass ratio for each component was component A/component B=1.0/1.5.

Example 11

A surface treatment agent was produced by mixing 10 mass parts of carboxymethyl chitosan (component A), 15 mass parts of 1,2,3,4-butane tetracarboxylic acid (component B), and 975 mass parts of water. This surface treatment agent was applied to the processing material (test plate) by a roll coating method so that the film amount after drying became 50 mg/m² and dried at 200° C. to form the undercoating and obtain the surface treatment plate (a metal plate with undercoatings formed thereon). The weight average molecular weight of the carboxymethyl chitosan was 100,000, the substituent introduction rate of the chitosan per monomer unit was 6.0 pieces, and the mixed mass ratio for each component was component A/component B=1.0/1.5.

Example 12

A surface treatment agent was produced by mixing 10 mass parts of carboxymethyl chitosan (component A), 15 mass parts of 1,2,3,4-butane tetracarboxylic acid (component B), and 975 mass parts of water. This surface treatment agent was applied to the processing material (test plate) by a roll coating method so that the film amount after drying became 50 mg/m² and dried at 200° C. to form the undercoating and obtain the surface treatment plate (a metal plate with undercoatings formed thereon). The weight average molecular weight of the carboxymethyl chitosan was 100,000, the substituent introduction rate of the chitosan per monomer unit was 0.1 pieces, and the mixed mass ratio for each component was component A/component B=1.0/1.5.

Example 13

A surface treatment agent was produced by mixing 10 mass parts of glyceryl chitosan (component A), 15 mass parts of 1,2,3,4-butane tetracarboxylic acid (component B), and 975 mass parts of water. This surface treatment agent was applied to the processing material (test plate) by a roll coating method so that the film amount after drying will be 50 mg/m² and dried at 200° C. to form the undercoating and obtain the surface treatment plate (a metal plate with undercoatings formed thereon). The weight average molecular weight of the glyceryl chitosan was 1,000, the substituent introduction rate of the chitosan per monomer unit was 1.5 pieces, and the mixed mass ratio for each component was component A/component B=1.0/1.5.

Example 14

A surface treatment agent was produced by mixing 10 mass parts of glyceryl chitosan (component A), 15 mass parts of 1,2,3,4-butane tricarboxylic acid (component B), and 975 mass parts of water. This surface treatment agent was applied to the processing material (test plate) by a roll coating method so that the film amount after drying became 50 mg/m² and dried at 60° C. to form the undercoating and obtain the surface treatment plate (a metal plate with undercoatings formed thereon). The weight average molecular weight of the glyceryl chitosan was 100,000, the substituent introduction rate of the chitosan per monomer unit was 1.5 pieces, and the mixed mass ratio for each component was component A/component B=1.0/1.5.

Example 15

A surface treatment agent was produced by mixing 0.2 mass parts of glyceryl chitosan (component A), 0.3 mass parts of 1,2,3,4-butane tetracarboxylic acid (component B), and 999.5 mass parts of water. This surface treatment agent was applied to the processing material (test plate) by a roll coating method so that the film amount after drying became 1 mg/m² and dried at 200° C. to form the undercoating and obtain the surface treatment plate (a metal plate with undercoatings formed thereon). The weight average molecular weight of the glyceryl chitosan was 100,000, the substituent introduction rate of the chitosan per monomer unit was 1.5 pieces, and the mixed mass ratio for each component was component A/component B=1.0/1.5.

Example 16

A surface treatment agent was produced by mixing 10 mass parts of glyceryl chitosan (component A), 15 mass parts of butane tricarboxylic acid (component B), and 975 mass parts of water. This surface treatment agent was applied to the processing material (test plate) by a roll coating method so that the film amount after drying became 50 mg/m² and dried at 40° C. to form the undercoating and obtain the surface treatment plate (a metal plate with undercoatings formed thereon). The weight average molecular weight of the glyceryl chitosan was 100,000, the substituent introduction rate of the chitosan per monomer unit was 1.5 pieces, and the mixed mass ratio for each component was component A/component B=1.0/1.5.

Example 17

A surface treatment agent was produced by mixing 0.1 mass parts of carboxymethyl chitosan (component A), 0.15 mass parts of butane tricarboxylic acid (component B), and 999.75 mass parts of water. This surface treatment agent was applied to the processing material (test plate) by a roll coating method so that the film amount after drying became 0.5 mg/m$^2$ and dried at 200° C. to form the undercoating and obtain the surface treatment plate (a metal plate with undercoatings formed thereon). The weight average molecular weight of the carboxymethyl chitosan was 100,000, the substituent introduction rate of the chitosan per monomer unit was 1.5 pieces, and the mixed mass ratio for each component was component A/component B=1.0/1.5.

Comparative Example 1

A surface treatment agent was produced by mixing 25 mass parts of glyceryl chitosan (component A) and 975 mass parts of water. This surface treatment agent was applied to the processing material (test plate) by a roll coating method so that the film amount after drying became 50 mg/m$^2$ and dried at 200° C. to form the undercoating and obtain the surface treatment plate (a metal plate with undercoatings formed thereon). The weight average molecular weight of the glyceryl chitosan was 100,000, the substituent introduction rate of the chitosan per monomer unit was 1.5 pieces.

Comparative Example 2

A surface treatment agent was produced by mixing 19.2 mass parts of glyceryl chitosan (component A), 5.8 mass parts of 1,2,3,4-butane tetracarboxylic acid (component B), and 975 mass parts of water. This surface treatment agent was applied to the processing material (test plate) by a roll coating method so that the film amount after drying became 50 mg/m$^2$ and dried at 200° C. to form the undercoating and obtain the surface treatment plate (a metal plate with undercoatings formed thereon). The weight average molecular weight of the glyceryl chitosan was 100,000, the substituent introduction rate of the chitosan per monomer unit was 1.5 pieces, and the mixed mass ratio for each component was component A/component B=1.0/0.3.

Comparative Example 3

A surface treatment agent was produced by mixing 4.2 mass parts of glyceryl chitosan (component A), 20.8 mass parts of 1,2,3,4-butane tetracarboxylic acid (component B), and 975 mass parts of water. This surface treatment agent was applied to the processing material (test plate) by a roll coating method so that the film amount after drying became 50 mg/m$^2$ and dried at 200° C. to form the undercoating and obtain the surface treatment plate (a metal plate with undercoatings formed thereon). The weight average molecular weight of the glyceryl chitosan was 100,000, the substituent introduction rate of the chitosan per monomer unit was 1.5 pieces, and the mixed mass ratio for each component was component A/component B=1.0/5.0.

Comparative Example 4

A surface treatment agent was produced by mixing 16.7 mass parts of glyceryl chitosan (component A), 8.3 mass parts of fluorotitanic acid (component D), and 975 mass parts of water. This surface treatment agent was applied to the processing material (test plate) by a roll coating method so that the film amount after drying became 50 mg/m$^2$ and dried at 200° C. to form the undercoating and obtain the surface treatment plate (a metal plate with undercoatings formed thereon). The weight average molecular weight of the glyceryl chitosan was 100,000, the substituent introduction rate of the chitosan per monomer unit was 1.5 pieces, and the mixed mass ratio for each component was component A/component D=1.0/1.5.

Comparative Example 5

A surface treatment agent was produced by mixing 16.7 mass parts of glyceryl chitosan (component A), 8.3 mass parts of fluorozirconic acid (component D), and 975 mass parts of water. This surface treatment agent was applied to the processing material (test plate) by a roll coating method so that the film amount after drying became 50 mg/m$^2$ and dried at 200° C. to form the undercoating and obtain the surface treatment plate (a metal plate with undercoatings formed thereon). The weight average molecular weight of the glyceryl chitosan was 100,000, the substituent introduction rate of the chitosan per monomer unit was 1.5 pieces, and the mixed mass ratio for each component was component A/component D=1.0/1.5.

TABLE 1

| | Surface treatment agent | | | | | | | |
|---|---|---|---|---|---|---|---|---|
| | Component A | | | | | | | |
| | Type | Substituent Introduction Rate (piece/unit) | Weight average molecular Weight | Component B | Other Components | Component A/Component B (mass ratio) | Drying Temperature (° C.) | Film Amount (mg/m$^2$) |
| Ex. 1 | A1 | 1.5 | 100,000 | B1 | — | 1.0/1.5 | 200 | 50 |
| Ex. 2 | A2 | 1.5 | 100,000 | B1 | — | 1.0/1.5 | 200 | 50 |
| Ex. 3 | A3 | 1.5 | 100,000 | B1 | — | 1.0/1.5 | 200 | 50 |
| Ex. 4 | A2 | 1.5 | 100,000 | B1 | — | 1.0/0.5 | 200 | 50 |
| Ex. 5 | A2 | 1.5 | 100,000 | B1 | — | 1.0/3.0 | 200 | 50 |
| Ex. 6 | A2 | 0.5 | 100,000 | B2 | — | 1.0/1.5 | 200 | 50 |
| Ex. 7 | A2 | 3.0 | 100,000 | B2 | — | 1.0/1.5 | 200 | 50 |
| Ex. 8 | A2 | 1.5 | 100,000 | B1 | C | 1.0/1.5 | 200 | 50 |
| Ex. 9 | A3 | 1.5 | 10,000 | B3 | — | 1.0/1.5 | 200 | 50 |
| Ex. 10 | A3 | 1.5 | 1,000,000 | B3 | — | 1.0/1.5 | 200 | 50 |
| Ex. 11 | A3 | 6.0 | 100,000 | B2 | — | 1.0/1.5 | 200 | 50 |
| Ex. 12 | A3 | 0.1 | 100,000 | B2 | — | 1.0/1.5 | 200 | 50 |

TABLE 1-continued

| | Surface treatment agent | | | | | | | |
|---|---|---|---|---|---|---|---|---|
| | Component A | | | | | | | |
| | Type | Substituent Introduction Rate (piece/unit) | Weight average molecular Weight | Component B | Other Components | Component A/Component B (mass ratio) | Drying Temperature (°C.) | Film Amount (mg/m$^2$) |
| Ex. 13 | A2 | 1.5 | 1,000 | B2 | — | 1.0/1.5 | 200 | 50 |
| Ex. 14 | A2 | 1.5 | 100,000 | B2 | — | 1.0/1.5 | 60 | 50 |
| Ex. 15 | A2 | 1.5 | 100,000 | B2 | — | 1.0/1.5 | 200 | 1 |
| Ex. 16 | A2 | 1.5 | 100,000 | B1 | — | 1.0/1.5 | 40 | 50 |
| Ex. 17 | A3 | 1.5 | 100,000 | B1 | — | 1.0/1.5 | 200 | 0.5 |
| Comp. Ex. 1 | A2 | 1.5 | 100,000 | — | — | — | 200 | 50 |
| Comp. Ex. 2 | A2 | 1.5 | 100,000 | B2 | — | 1.0/0.3 | 200 | 50 |
| Comp. Ex. 3 | A2 | 1.5 | 100,000 | B2 | — | 1.0/5.0 | 200 | 50 |
| Comp. Ex. 4 | A2 | 1.5 | 100,000 | — | D1 | — | 200 | 50 |
| Comp. Ex. 5 | A2 | 1.5 | 100,000 | — | D2 | — | 200 | 50 |

A1: Hydroxylalkyl chitosan
A2: Glyceryl chitosan
A3: carboxymethyl chitosan
B1: butane tricarboxylic acid
B2: 1,2,3,4-butane tetracarboxylic acid
B3: citric acid
C: γ-aminopropyl triethoxysilane
D1: fluorotitanic acid
D2: fluorozirconic acid

TABLE 2

| | Evaluation of HF-resistance of the undercoating | Evaluation of Workability of the Laminated Film (Evaluation of initial adherence) | |
|---|---|---|---|
| | | Aluminum plate (JIS A1050) | Stainless Plate (JIS SUS304) |
| Ex. 1 | ⊚ | ⊚ | ⊚ |
| Ex. 2 | ⊚ | ⊚ | ⊚ |
| Ex. 3 | ⊚ | ⊚ | ⊚ |
| Ex. 4 | ⊚ | ⊚ | ⊚ |
| Ex. 5 | ⊚ | ⊚ | ⊚ |
| Ex. 6 | ⊚ | ⊚ | ⊚ |
| Ex. 7 | ⊚ | ⊚ | ⊚ |
| Ex. 8 | ⊚ | ⊚ | ⊚ |
| Ex. 9 | ⊚ | ⊚ | ⊚ |
| Ex. 10 | ⊚ | ⊚ | ⊚ |
| Ex. 11 | ○ | ⊚ | ⊚ |
| Ex. 12 | ⊚ | ○ | ○ |
| Ex. 13 | ○ | ○ | ○ |
| Ex. 14 | ○ | ⊚ | ⊚ |
| Ex. 15 | ⊚ | ⊚ | ⊚ |
| Ex. 16 | △ | ⊚ | ⊚ |
| Ex. 17 | ○ | ○ | ○ |
| Comp. Ex. 1 | X | △ | △ |
| Comp. Ex. 2 | X | ○ | ○ |
| Comp. Ex. 3 | ⊚ | △ | △ |
| Comp. Ex. 4 | X | ○ | ○ |
| Comp. Ex. 5 | X | ○ | ○ |

TABLE 3

Evaluation of Secondary Adherence of Laminated Film Processing Material

| | Aluminum Plate | | Copper Plate | | Nickel Plated Copper Plate | | Tin Plated Copper Plate | |
|---|---|---|---|---|---|---|---|---|
| | \multicolumn{8}{c}{Immersion Fluid} | | | | | | | |
| | HF | LiPF$_6$ | HF | LiPF$_6$ | HF | LiPF$_6$ | HF | LiPF$_6$ |
| Ex. 1 | ⊚ | ⊚ | ⊚ | ⊚ | ⊚ | ⊚ | ⊚ | ⊚ |
| Ex. 2 | ⊚ | ⊚ | ⊚ | ⊚ | ⊚ | ⊚ | ⊚ | ⊚ |
| Ex. 3 | ⊚ | ⊚ | ⊚ | ⊚ | ⊚ | ⊚ | ⊚ | ⊚ |
| Ex. 4 | ⊚ | ⊚ | ⊚ | ⊚ | ⊚ | ⊚ | ⊚ | ⊚ |
| Ex. 5 | ⊚ | ⊚ | ⊚ | ⊚ | ⊚ | ⊚ | ⊚ | ⊚ |
| Ex. 6 | ⊚ | ⊚ | ⊚ | ⊚ | ⊚ | ⊚ | ⊚ | ⊚ |
| Ex. 7 | ⊚ | ⊚ | ⊚ | ⊚ | ⊚ | ⊚ | ⊚ | ⊚ |
| Ex. 8 | ⊚ | ⊚ | ⊚ | ⊚ | ⊚ | ⊚ | ⊚ | ⊚ |
| Ex. 9 | ⊚ | ⊚ | ⊚ | ⊚ | ⊚ | ⊚ | ⊚ | ⊚ |
| Ex. 10 | ⊚ | ⊚ | ⊚ | ⊚ | ⊚ | ⊚ | ⊚ | ⊚ |
| Ex. 11 | ○ | ⊚ | ○ | ○ | ○ | ⊚ | ○ | ○ |
| Ex. 12 | ○ | ⊚ | ○ | ⊚ | ○ | ⊚ | ○ | ○ |
| Ex. 13 | ○ | ⊚ | ○ | ○ | ○ | ○ | ⊚ | ○ |
| Ex. 14 | ⊚ | ⊚ | ⊚ | ⊚ | ⊚ | ⊚ | ⊚ | ⊚ |
| Ex. 15 | ⊚ | ⊚ | ⊚ | ○ | ⊚ | ⊚ | ⊚ | ⊚ |
| Ex. 16 | ⊚ | ⊚ | ⊚ | ⊚ | ⊚ | ⊚ | ⊚ | ⊚ |
| Ex. 17 | ⊚ | ○ | ⊚ | ○ | ○ | ⊚ | ○ | ⊚ |
| Comp. Ex. 1 | X | X | X | X | X | X | X | X |
| Comp. Ex. 2 | X | △ | X | △ | X | △ | X | △ |
| Comp. Ex. 3 | X | △ | X | △ | X | △ | X | △ |
| Comp. Ex. 4 | X | X | X | X | X | X | X | X |
| Comp. Ex. 5 | X | X | X | X | X | X | X | X |

Based on the aforementioned evaluation methods, the surface treated plates (metal plates in which undercoatings were formed) of Examples 1 to 17 and Comparative Examples 1 to 5 obtained in the aforementioned manner were evaluated for the HF-resistance of the undercoatings. Furthermore, laminated films were produced by the aforementioned laminated film production methods using the surface treated plates of Examples 1 to 17 and Comparative Examples 1 to 5, and the workability of the laminated films (initial adherence) and the secondary adherence of the laminated films were evaluated based on the aforementioned evaluation method. The evaluation results were shown in Tables 2 and 3.

As it is clear from Tables 2 and 3, the surface treatment plates of Examples 1 to 17 have good HF-resistance, and the workability (initial adherence) of the laminated films constituted using the surface treatment plates of Examples 1 to 17 and the secondary adherence of the laminated films were excellent.

Examples 11 and 12 are examples in which the substituent introduction rate of chitosan derivatives are deviated from the suitable range, and although a slight decrease in performance is seen as compared with Examples 1 to 10, they have the capabilities to bear actual usage. Example 13 is an example in which the weight average molecular weight of the chitosan derivative deviates from the suitable range, and although a slight decrease in performance is seen as compared with Examples 1 to 10, it has the capability to bear actual usage. Example 16 is an example in which the heating temperature for forming the undercoating deviates from the suitable range, and although a slight decrease in performance is seen as compared with Examples 1 to 10, it has the capability to bear actual usage. Example 17 is an example in which the forming amount of the undercoating deviates from the suitable range, and although a slight decrease in performance is seen as compared with Examples 1 to 10, it has the capability to bear actual usage.

On the other hand, Comparative Example 1, which was treated with a surface treatment agent not containing a carboxyl compound (component B), had poor HF-resistance and the secondary adherence of the laminated film was insufficient. Also, Comparative Example 2 treated with the surface treatment agent wherein the chitosan derivative/carboxyl compound containing mass ratio deviates from the stipulated range of the present invention (the contained ratio of component B is less than the stipulated range) had poor HF resistance and the secondary adherence of the laminated film was insufficient. Also, Comparative Example 3 treated with the surface treatment agent wherein the contained mass ratio of the chitosan derivative/carboxyl compound deviates from the stipulated range of the present invention (the contained ratio of the component B is more than the stipulated range) had insufficient laminated film workability (initial adherence) and the secondary adherence of the laminated film was also insufficient. In addition, Comparative Examples 4 and 5 containing metal compounds as recited in Patent Documents 5 and 6 had poor HF-resistance and the secondary adherence of the laminated film were insufficient.

The present invention claims priority to Japanese Patent Application No. 2012-98507 filed on Apr. 24, 2012, the entire disclosure of which is incorporated herein by reference in its entirety.

The terms and descriptions used herein are used only for explanatory purposes and the present invention is not limited to them. The present invention allows various design-changes falling within the claimed scope of the present invention unless it deviates from the spirits of the invention.

INDUSTRIAL APPLICABILITY

The laminating water-based surface treatment agent of the present invention can be preferably used as a surface treatment agent for a packaging material for a case and a tab lead for a lithium ion secondary battery for automobiles, in which especially harsh corrosive environment can be expected. The packaging material for a battery case of the present invention can be suitably used as a packaging material for a case for a lithium ion secondary battery for automobiles. Also, the tab lead for a battery of the present invention can be preferably used as a tab lead for a lithium ion secondary battery for automobiles.

DESCRIPTION OF THE REFERENCE NUMERALS

1: packaging material for a battery case
4: metal layer
10: metal plate
11: undercoating
12: undercoating
20: tab lead for a battery
21: metal layer
30: metal plate
31: undercoating

The invention claimed is:

1. A packaging material for a battery case, the packaging material comprising:
a heat resistant resin stretched film layer as an outer layer;
a thermoplastic resin unstretched film layer as an inner layer; and
a metal layer arranged between the outer layer and the inner layer, wherein
the metal layer includes a metal plate having an undercoating on at least an inner layer side surface of the metal plate,
the undercoating is a film formed by treating at least the inner layer side surface of the metal plate with a water-based surface treatment agent including a chitosan derivative, a carboxylic compound having at least one carboxyl group in a molecule, and water; and
a content mass ratio of the chitosan derivative/the carboxyl compound falls within a range of 1.0/0.5 to 1.0/3.0.

2. A tab lead for a battery, the tab lead comprising:
a metal layer including an undercoating on at least one surface of a metal plate, wherein
the undercoating is a film formed by treating at least one surface of the metal plate with a water-based surface treatment agent including a chitosan derivative, a carboxylic compound having at least one carboxyl group in a molecule, and water; and
a content mass ratio of the chitosan derivative/the carboxyl compound falls within a range of 1.0/0.5 to 1.0/3.0.

3. A tab lead for a battery, the tab lead comprising:
a metal layer; and
an insulation tab film laminated on both sides of the metal layer, wherein
the metal layer includes a metal plate having an undercoating on at least one surface of the metal plate,
the undercoating is a film formed by treating the at least one surface of the metal plate with a water-based surface treatment agent including a chitosan derivative, a carboxylic compound having at least one carboxyl group in a molecule, and water; and
a content mass ratio of the chitosan derivative/the carboxyl compound falls within a range of 1.0/0.5 to 1.0/3.0.

* * * * *